(12) United States Patent
Holt et al.

(10) Patent No.: US 11,097,467 B2
(45) Date of Patent: Aug. 24, 2021

(54) METHOD OF AUTOMATING THE MANUFACTURE OF 3D PRINTED OBJECTS

(71) Applicant: PhotoCentriC Limited, Peterborough (GB)

(72) Inventors: Paul Holt, Peterborough (GB); David O'Brien, Peterborough (GB); Ed Barlow, Peterborough (GB)

(73) Assignee: PhotoCentriC Limited, Peterborough (GB)

( * ) Notice: Subject to any disclaimer, the term of this patent is extended or adjusted under 35 U.S.C. 154(b) by 118 days.

(21) Appl. No.: 16/583,452

(22) Filed: Sep. 26, 2019

(65) Prior Publication Data

US 2020/0094469 A1 Mar. 26, 2020

(30) Foreign Application Priority Data

Sep. 26, 2018 (GB) .................. 1815653

(51) Int. Cl.
*B29C 64/124* (2017.01)
*B29C 64/245* (2017.01)
*B29C 64/255* (2017.01)
*B29C 64/35* (2017.01)
*B29C 64/227* (2017.01)
(Continued)

(52) U.S. Cl.
CPC .......... *B29C 64/124* (2017.08); *B29C 64/188* (2017.08); *B29C 64/194* (2017.08); *B29C 64/227* (2017.08); *B29C 64/232* (2017.08); *B29C 64/241* (2017.08); *B29C 64/245* (2017.08); *B29C 64/255* (2017.08); *B29C 64/264* (2017.08); *B29C 64/35* (2017.08); *B29C 64/379* (2017.08); *B33Y 10/00* (2014.12); *B33Y 30/00* (2014.12); *B33Y 40/00* (2014.12)

(58) Field of Classification Search
CPC ... B29C 64/129; B29C 64/188; B29C 64/194; B29C 64/232; B29C 64/236; B29C 64/241
See application file for complete search history.

(56) References Cited

U.S. PATENT DOCUMENTS 5,031,120 A * 7/1991 Pomerantz ............ B29C 64/135
　　　　　　　　　　　　　　　　　　 700/120
5,088,047 A * 2/1992 Bynum ................. B29C 64/141
　　　　　　　　　　　　　　　　　　 700/182
(Continued)

FOREIGN PATENT DOCUMENTS

DE　　102017002448 A1　11/2017
GB　　　　2538333 A　11/2016
(Continued)

OTHER PUBLICATIONS

UKIPO Search Report for application GB 1913883.3, dated Mar. 9, 2020 (Year: 2020).*

*Primary Examiner* — Timothy Kennedy
(74) *Attorney, Agent, or Firm* — E. Eric Mills; Nexsen Pruet, PLLC

(57) ABSTRACT

A stereolithographic 3D printer comprising a number of functional stations that are connected in an automated process so that they can perform the following functions simultaneously; a) the selective exposure of liquid photopolymer, b) the washing off of excess photopolymer, c) the post exposure of the built part (optionally under water) and optionally d) the load and unloading of the part.

7 Claims, 3 Drawing Sheets

(51) Int. Cl.
*B29C 64/379* (2017.01)
*B29C 64/264* (2017.01)
*B29C 64/232* (2017.01)
*B29C 64/188* (2017.01)
*B29C 64/194* (2017.01)
*B29C 64/241* (2017.01)
*B33Y 40/00* (2020.01)
*B33Y 10/00* (2015.01)
*B33Y 30/00* (2015.01)

(56) References Cited

U.S. PATENT DOCUMENTS

| | | | | |
|---|---|---|---|---|
| 5,301,863 | A * | 4/1994 | Prinz | B33Y 10/00 228/33 |
| 2005/0150592 | A1* | 7/2005 | LaFaille | B33Y 30/00 156/239 |
| 2006/0022379 | A1* | 2/2006 | Wicker | B33Y 30/00 264/255 |
| 2010/0006640 | A1* | 1/2010 | Culp | G06K 13/07 235/375 |
| 2010/0291304 | A1* | 11/2010 | Becker | H05K 3/00 427/355 |
| 2012/0195994 | A1* | 8/2012 | El-Siblani | B29C 64/124 425/174.4 |
| 2013/0075957 | A1* | 3/2013 | Swanson | B29C 64/40 264/405 |
| 2013/0108726 | A1* | 5/2013 | Uckelmann | B33Y 30/00 425/174.4 |
| 2014/0065194 | A1* | 3/2014 | Yoo | B29C 64/165 424/400 |
| 2014/0167326 | A1* | 6/2014 | Jones | B29C 64/141 264/427 |
| 2015/0131074 | A1* | 5/2015 | Ebert | B29C 64/182 355/77 |
| 2015/0165695 | A1* | 6/2015 | Chen | B29C 64/129 425/132 |
| 2015/0290878 | A1* | 10/2015 | Houben | B29C 64/112 419/1 |
| 2017/0217091 | A1 | 8/2017 | Hull | |
| 2018/0126458 | A1 | 5/2018 | Choi | |
| 2018/0169940 | A1 | 6/2018 | Dunne et al. | |
| 2018/0236726 | A1* | 8/2018 | Etcheson | B33Y 50/00 |
| 2019/0224917 | A1* | 7/2019 | Venkatakrishnan | B29C 64/205 |
| 2019/0299283 | A1* | 10/2019 | Sheinman | B22F 12/224 |
| 2020/0001536 | A1* | 1/2020 | DeSimone | B29C 64/379 |

FOREIGN PATENT DOCUMENTS

WO 2015072921 A 5/2015
WO 2016122408 A 8/2016

* cited by examiner

METHOD OF AUTOMATING THE MANUFACTURE OF 3D PRINTED OBJECTS

CROSS-REFERENCE TO RELATED APPLICATIONS

This application claims priority under 35 U.S.C. § 119 to Great Britain Patent Application No. 1815653.9 filed Sep. 26, 2018, the entirety of which is incorporated by reference herein.

TECHNICAL FIELD

This invention relates to the field of 3D printing used to make a 3D object where a 3D printed object is formed using electromagnetic radiation emitted from a visual display screen or emissive pixel array screen and where the processes involved in the manufacturing process have been automated to reduce human input and optimise quality.

BACKGROUND

Three-dimensional (3D) printing, also known as rapid prototyping or additive manufacturing, is a method of forming 3D objects by building up sequential layers, each defined using a respective digital representation. The digital representations may be formed by scanning a physical object in three-dimensions or may be formed by digitally sectioning a three-dimensional computer-aided design (CAD) image into layers, typically of equal thicknesses.

In stereolithography apparatus printing (SLA), the printer builds 3D objects from successive layers of selectively polymerised liquid photosensitive polymer (resin), also referred to as photopolymer. The liquid photopolymer is polymerised (hardened) by electromagnetic radiation exposure of an appropriate wavelength, e.g. visible light or near visible ultraviolet light.

To form a 3D printed object by stereolithographic 3D printing, selective illumination by electromagnetic radiation is provided from an imaging source to form each layer, with the first layer being formed on a build platform, the separation distance between the build platform and imaging source being increased by the thickness of a layer with the next layer of selective polymerisation being formed on the preceding layer. The process of selective exposure and separation is repeated until the complete 3D printed object has been built layer by layer.

Traditionally, photopolymer was selectively hardened by light emitted from a laser beam or by focusing the light from a digital light processing (DLP) projector emitted through its digital mirror device. This could be irradiated onto either the upper or lower layer of resin in a vat. This invention relates to the field of 3D printing where the image source is a visual display screen, commonly an LCD (Liquid Crystal Display) screen. LCD screens have recently become widely used by manufacturers who have incorporated the screens as the digital mask to deliver the custom polymerisation. LCD screens are particularly attractive as an image creation device in 3D printers because they are mass manufactured consumer items and are therefore available at very low cost. Furthermore, they generate very high-resolution images driven by the demand to view higher and higher image quality images on them. They also expose an entire layer of the vat simultaneously, with very even light distribution, without any requirement to refocus the light through a lens. They are available in a wide variety of formats from the very small screens used in near-eye headsets, through mobiles, tablets, monitors up to TV screens. They are also simpler to incorporate into 3D printers than the competitive technologies. In the case of a laser 3D printer, complex electronics and galvanometers are required and correspondingly in the case of a DLP printer a lens is required to refocus the widening light beam back into a smaller area. In contrast, visual display screen device-based 3D printers are effectively a digitally controllable light mask that defines the area of the build platform with an optionally modified light generation source, an electronic control board, a linear drive and a resin containment vat.

In the typical process of making an object by SLA printing; the object is created by sequential exposure of liquid photopolymer to light in layers, interspersed by motion perpendicularly away from the light generation surface, the finished object is then elevated from the photopolymer vat, the resin attached to the surface of the object being allowed to drain back into the vat, the print platform to which the object has been built upon is then typically removed from the printer by hand and transferred to a wash station where it is washed with a solvent solution to remove any remaining liquid resin attached to the object, it is then rinsed and transferred to a separate post exposure station where it is irradiated with uniform light of a similar wavelength to that which created the object in the first place. Optionally this process can take place under water, before it is rinsed again and dried ready for use. This process can take place at a temperature above 25° C. as a replacement or addition to the irradiated light. The object can be removed from the build platform at the end of any of these stages. These three main processes, namely exposing (and draining), washing (and rinsing) and post exposing (and rinsing and drying) are normally achieved with manual intervention at each stage. This leads to excessive labour, longer processing times and the procedure is often subject to manually induced variability and is therefore not optimised.

It is an object of this invention to provide an optimised method, using minimal labour, for processing 3D objects created by SLA printing using visual display screens as the light encoding device for the photopolymer.

Previous methods of achieving mass manufacture with 3D printing are described as follows; US Application Publication 20180169940 to Dunne et al, herein incorporated by reference in its entirety, describes methods for making 3D printed objects by SLA printing on a conveyor belt.

US Application Publication 20180126458 to Choi, herein incorporated by reference in its entirety, describes methods for mass manufacturing auto parts using 3D printed objects using a laser.

SUMMARY OF THE DISCLOSURE

According to a first aspect of the disclosure there is provided a stereolithographic 3D printer comprising a plurality of build platforms and also comprising stations for printing the 3D object or post processing of the 3D object. The aforementioned stations may include but are not limited to the following:

an exposure station comprising a vat and a visual display screen, said vat and said visual display screen being in planar parallel and in direct contact, said exposure station being configured such that liquid photopolymer situated in the vat and between a build platform and the visual display screen is exposed to a series of images on the visual display screen, each image being a cross-section of the 3D object, partially curing the liquid photopolymer to form an intermediate object on the build platform;

a wash station configured to remove unpolymerised photopolymer from the intermediate object with a solution;

a post exposure station comprising an illumination source of a wavelength configured to polymerise the partially cured photopolymer of the intermediate object to form the 3D object; and optionally a load and unload station to remove the 3D object from the build platform;

wherein said build platforms are configured to move from station to station and wherein said stations are configured to carry out their functions simultaneously, each operating at any given time on a different build platform or the object on said different build platform.

Suitably the visual display screen is a liquid crystal display screen.

Suitably wherein the light emitted by the visual display screen is visible or near visible.

Suitably the stations are each configured to move towards or away from the build platform along a set of axes that are parallel to each other and wherein the at least one build platform is configured to move in a direction perpendicular to said axes.

Suitably each station moves in the z-direction independently of any other station.

Suitably the exposure process is independent of the wash process.

Suitably each of the plurality of build platforms are discrete elements.

According to a second aspect of the present invention there is provided a method of printing a 3D object, said method comprising passing a plurality of build platforms through a series of stations:

an exposure station comprising a vat of liquid photopolymer and a visual display screen, said vat and said virtual display screen being planar parallel and in direct contact;

a wash station comprising a solution;

a post exposure station comprising an illumination source of a wavelength; and optionally a load and unload station;

said method comprising:

at the exposure station exposing liquid photopolymer situated in the vat and between a build platform and the visual display screen to a series of images on the visual display screen, each image being a cross-section of the 3D object, partially curing the liquid photopolymer to form an intermediate object on the build platform;

at the wash station, removing unpolymerised photopolymer from the intermediate object with a solution;

at the post exposure station polymerising the partially cured photopolymer of the intermediate object to form the 3D object; and optionally at the optional load and unload station, removing the 3D object from the build platform;

wherein said stations are configured to carry out their functions simultaneously, each operating at any given time on a different build platform or the object on said different build platform.

For the absence of doubt, the method of the second aspect may be carried out on the 3D printer of the first aspect.

This method describes procedures for the automation of the separate operations necessary to carry out the creation of an object by stereolithographic 3D printing where the exposure light is generated by a visual display screen. This process combines the exposure, wash, post exposure and load and unload processes into a linked mechanical sequence so that each of these processes can be performed simultaneously. In this example each of the principle processes is a separate and discrete process from the other principle processes. For example, the exposure process is discontinuous from the washing process and the post exposure process is discontinuous from the washing process.

The process can be configured in different orientations; a linear track with the functional stations orientated down one side, a rotational format with the stations equally spaced in a circular pattern either rotating vertically or horizontally, or a combination of these orientations where the platform returns to the position in which it started the process. The three principal processes of exposing, washing and post exposing all take a considerable period of time and combining them increases the production efficiency of the machine, the final section of part removal, platform loading and support removal (if necessary) can take place during the inline process or separate from it without reducing the production output. It should be appreciated that it is not limited to these configurations and other arrangements and combinations of these orientations of the stations are possible within the scope of this application.

The processes in SLA printing all require accurately controlled z-axis motion (build direction) in the orientation of which repeated layers are made. It is a further novelty of this invention that the motion is delivered to the lower elements of the units namely the exposure station containing the LCD screen with optional back light unit and vat containing the resin, the washing station containing the washing solution and containment vat, the post exposure station containing a heat source or light array and optional oxygen removal medium such as water and optionally a load and unload station. This is in contrast to conventional 3D printers which typically have the z-axis motion delivered to the platform with the aforementioned stations remaining fixed in the chassis. Delivering motion parallel to the z-axis to the lower elements only, enables the platforms correspondingly to have just one plane of motion, rotation about the z-axis. If motion is delivered to the platform in the conventional manner, the platform has to accurately deliver both z and x motions which is more complicated to keep accurately aligned.

There is provided a stereolithographic 3D printer with functions that take place simultaneously; comprising but not limited to an exposure station comprising a vat containing liquid photopolymer in direct contact with a visual display screen; a wash station comprising a solution to remove unpolymerised photopolymer; a post exposure station comprising an illumination source of a wavelength that polymerises the photopolymer; and optionally a load and unload station to remove the object from the build platform.

Advantageously there is provided a stereolithographic 3D printer wherein the build platform moves only in a direction perpendicular to the direction the object was created in.

Typically the base of the vat is transparent. The base of the vat has a top surface and a bottom surface. When the vat contains photopolymer, the top surface is in contact with the liquid photopolymer, The visual display screen is in contact with the bottom surface of the vat. Thus the liquid photopolymer is exposed to images from the visual display screen through the base of the vat.

The exposure station comprises of a vat containing liquid photopolymer; a screen assembly supporting a visual display screen which delivers selective exposure of electromagnetic radiation suitable for polymerising successive layers of photopolymer to build a 3D printed object. The wash station comprises of a vat containing a washing solution with optional method of agitation. The post exposure station may comprise a set of lights emitting light of a suitable wavelength to initiate polymerisation, optionally carried out under water. The load and unload station may allow access to the build platform to remove the object from it, before enabling the platform to return to the exposure station. All of the stations may be arranged to move vertically upwards and downwards. The build platforms may be enabled to move horizontally at 90° to the build direction. The longest process performed at any given station may determine the cycle time of every station.

The invention may also be as described in the following numbered paragraphs:

1. A stereolithographic 3D printer comprising a plurality of build platforms and also comprising the following stations:
   an exposure station comprising a vat and a visual display screen, said vat and said virtual display screen being in the same vertical plane, said exposure station being configured such that liquid photopolymer situated in the vat and between a build platform and the visual display screen is exposed to a series of images on the visual display screen, each image being a cross-section of the 3D object, partially curing the liquid photopolymer to form an intermediate object on the build platform;
   a wash station configured to remove unpolymerised photopolymer from the intermediate object with a solution;
   a post exposure station comprising an illumination source of a wavelength configured to polymerise the partially cured photopolymer of the intermediate object to form the 3D object; and optionally
   a load and unload station to remove the 3D object from the build platform;
   wherein said build platforms are configured to move from station to station and wherein said stations are configured to carry out their functions simultaneously, each operating at any given time on a different build platform or the object on said different build platform.
2. A stereolithographic 3D printer of paragraph 1, wherein the visual display screen is a liquid crystal display screen.
3. A stereolithographic 3D printer of paragraph 2 wherein the light emitted by the visual display screen is visible or near visible.
4. A stereolithographic 3D printer of any one of paragraphs 1 to 3 wherein the stations are each configured to move towards or away from the build platform along a set of axes that are parallel to each other and wherein the at least one build platform is configured to move in a direction perpendicular to said axes.
5. A method of printing a 3D object, said method comprising passing a plurality of build platforms through a series of stations:
   an exposure station comprising a vat of liquid photopolymer and a visual display screen, said vat and said virtual display screen being in the same vertical plane;
   a wash station comprising a solution;
   a post exposure station comprising an illumination source of a wavelength; and optionally
   a load and unload station;
   said method comprising:
   in the exposure station exposing liquid photopolymer situated in the vat and between a build platform and the visual display screen to a series of images on the visual display screen, each image being a cross-section of the 3D object, partially curing the liquid photopolymer to form an intermediate object on the build platform;
   in the wash station, removing unpolymerised photopolymer from the intermediate object with a solution;
   in the post exposure station polymerising the partially cured photopolymer of the intermediate object to form the 3D object; and optionally
   in the optional load and unload station, removing the 3D object from the build platform;
   wherein said stations are configured to carry out their functions simultaneously, each operating at any given time on a different build platform or the object on said different build platform.

DESCRIPTION OF THE DRAWINGS

Examples are further described hereinafter with reference to the accompanying drawings.

In the drawings like numbers refer to like parts.

DETAILED DESCRIPTION

This method describes the automation of the separate processes in an SLA printer where the form of exposure is light emitted from a visual display screen. The process in this invention combines the exposure, wash, post exposure and optional load and unload processes in a sequence so that each of these processes can be performed simultaneously. In this example, each of these processes have a distinct station such that each process is a distinct and separate step in the method. It is a requirement of SLA printers that they must have accurate motion in the z-axis or build direction. As described herein the term "z-axis" is intended to refer to the axis defined by the build direction. This method describes a method of automation that separates the tasks of motion in the xy-plane and motion in the z-axis, here the stations move vertically in the z-axis only and the print platforms move in a rotational or linear motion in the horizontal plane. It is a novelty therefore of this approach that the motion decouples the rotational motion from the highly accurate vertical motion required for the individual processes. The process can be organised as in FIG. 1 where the layout is effectively a rotational movement or in FIG. 2 where it is performed in a straight line with a linear return, or a combination of both of the processes.

Figure 1:
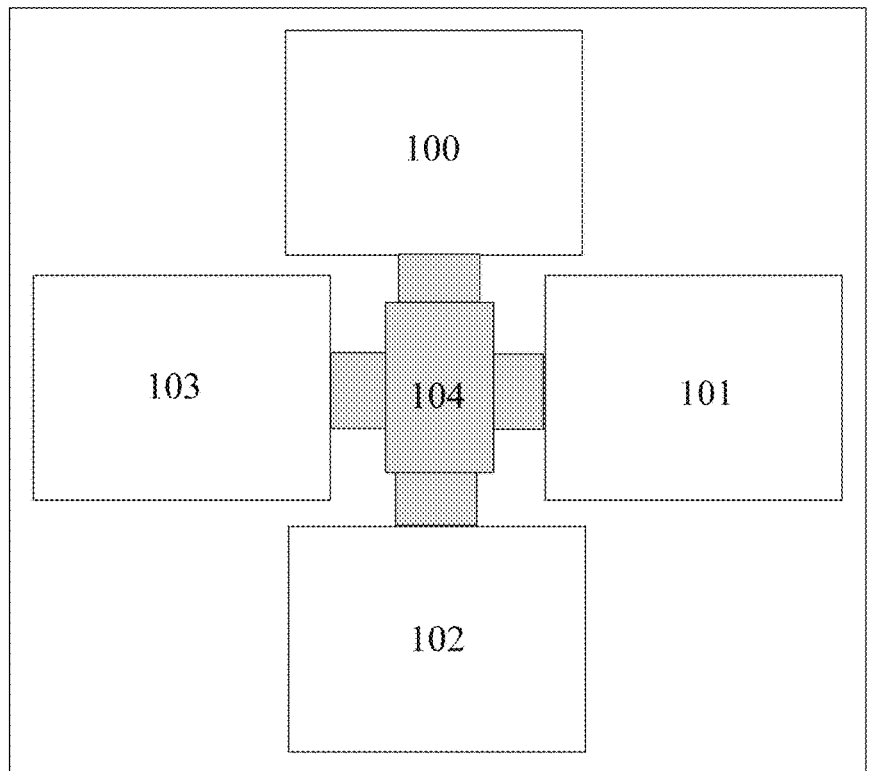
FIG. 1 illustrates a plan view of an example of a stereolithographic 3D printer.

FIG. 1 describes a configuration where the machine consists of the exposure station (100) containing a build platform, vat containing photopolymer, visual display screen and optional back lighting unit; the washing station (101) containing a build platform, washing solution, optional heat source and optional agitation mechanism; the post exposure station (102) containing a build platform with a light or heat source of suitable intensity and wavelength to initiate polymerisation with an optional oxygen removal mechanism such as immersion under water contained in a vat; and the optional load and unload station (103) where the platform with the object attached to it can be replaced by a clean one. The stations have linear drives acting on them vertically with the platforms rotating around a central column (104).

In this example the stations are arranged equidistantly around the central column (104), for example each of the stations is at 90 degrees to the neighbouring station. In examples where there are additional stations for example 5 stations the stations may be arranged at 72 degrees to one another.

The stations are at fixed positions in the x-axis and y-axis and the build platforms rotate about the central column to move between different stations. In this example there may be multiple builds at one time, for example a first build platform may have completed an exposure step at the exposure station (100) and be in the wash station (101), while a further build platform is undergoing an exposure step in the exposure station (100). The build platforms are linked together and move in the xy-plane around the central column. When all the stations have completed their associated process the build platforms move to the next station. In this way each step that the build platform undergoes is separate from the previous step and the subsequent step.

In this example the movement of the build platforms is limited to the xy-plane, that is the build platforms do not move in the z-axis. The stations are limited to movement in the z-axis. To initiate the associated process the station may move in the z direction to substantially enclose the build platform. Once the process is completed the station may then move away from the build platform in the z direction. The movement of the individual stations is unrelated to the other stations. For example, the wash station (101) may take less time for the wash process than the exposure process in the exposure station (100), as such, the wash station (101) may move away from the build platform while the further platform remains within the exposure station (100).

Figure 2:
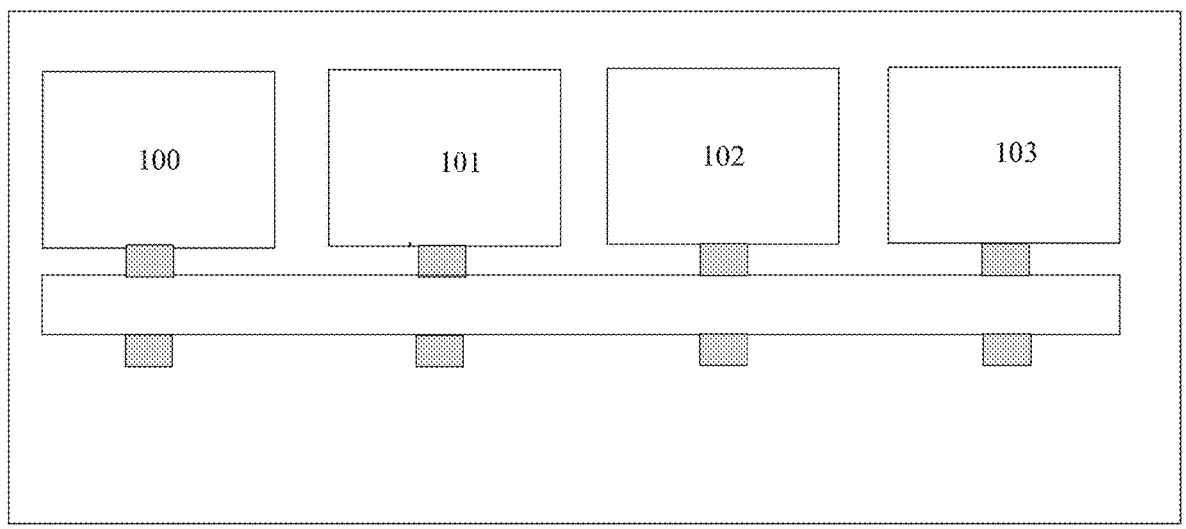
FIG. 2 illustrates a plan view of an alternative example of a stereolithographic 3D printer.

FIG. 2 describes a configuration where the machine consists of the same stations necessary to carry out exposing (100), washing (101), post exposing (102) and optionally loading and unloading (103), but they are organised so that all the processes take place in a linear manner with a return side containing non-functioning platforms. In this example instead of the rotating arrangement as described above in relation to FIG. 1 the build platforms instead move in a linear manner in the xy-plane. The stations are set in a linear configuration such that the build plates can move between stations without any movement in the z-direction.

Both of the configurations of FIG. 1 and FIG. 2 have advantages and disadvantages in terms of ease of construction, use and space. Other configurations of these processes are possible while maintaining the principal of this invention.

Figure 3:
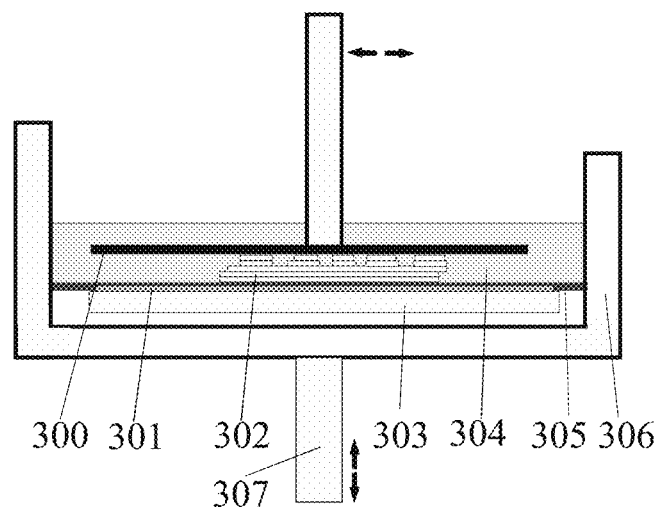
FIG. 3 illustrates a cross sectional view of an example exposure station.

FIG. 3 describes an exposure station layout to selectively harden the photopolymer contained in a vat illuminated by a visual display screen where the station only moves in the vertical axis. FIG. 3 shows the exposure station where the print platform (300) supports the printed object (302) as it is built and is created from selective electromagnetic radiation from a visual display screen (301) suitable for polymerising the liquid photosensitive polymer (304) in the vat (306) with visible light or near visible ultraviolet light. The visual display screen can be optionally protected with a film (305) of chemical composition including but not limited to Polymethylpentene (PMP), Fluorinated Ethylene Propylene (FEP), Perfluroalkoxy (PFA), Ethylene Chlorotrifluoroethylene (ECTFE), Polyvinylidene Fluoride (PVDF), Polypropylene (PP) or Polyester (PET). These films may be provided onto a substrate as monofilms or co-extrusions or laminates. Alternatively, the vat base may be provided with a very low energy surface on the inner surface, in contact with the photopolymer to reduce adhesion of the 3D printed objects to it, for example being treated with silanes, silicones, silsesquioxanes or the like. Specifically, the silicone coating may be polydimethylsiloxane (PDMS), for example Sylgard® 184 manufactured by the Dow Chemical Company.

In the illustrated exposure station in FIG. 3, the screen (301) is an LCD screen. The LCD screen containing an array of pixels, each of which has a controllable optical transmissivity at the wavelength(s) at which the photopolymer polymerises, e.g. each pixel has a transmissivity that may be selectively controlled to be substantially transparent or substantially opaque, and may additionally be set to one or more intermediate levels of transmissivity. In the illustrated example the LCD screen is a 5.5" format 2160×3840 pixels LCD panel made by Sharp model No. LS055D1SX04 with an active area of 68.04 mm×120.96 mm and a pixel pitch of 32 microns in the x and y directions. The screen may be a (non-emissive) visual display screen for use with backlighting, e.g. a separate light source, or backlighting that is built-into the screen. In a further alternative, the screen may be an emissive pixel array screen, i.e. the screen may be selectively light emitting, for example being a light emitting diode (LED) screen comprising an array of pixels, each of which has a controllable optical emission at the wavelength (s) at which the photopolymer polymerises for example, it may be an organic light-emitting diode (OLED) screen.

The visual display screen or emissive pixel array screen may be but is not limited to the following types: Liquid Crystal Display (LCD), Light Emitting Diode (LED), Electronic paper (E Ink), Electroluminescent display (ELD), Plasma Display Panel (PDP) or Organic Light Emitting Diode Display (OLED). In the illustrated printer, a plurality of light sources is shown, each of which may be separately collimated, desirably having an emission angle of 15° or less. Alternatively, a single light source may be used. A lens may be provided for collimating the light source, e.g. a Fresnel lens or a lenticular lens.

In the case that the screen assembly has a plurality of screens, the screens may be arranged in an orthogonal two-dimensional array of screens. Alternatively, the plurality of screens may be a single line of screens. The plurality of screens may be tessellated in rows with an offset between successive rows (e.g. each row is offset by half a screen width or length, in a similar manner to "header bond" brickwork). The plurality of screens may be arranged in a spiral pattern or pattern of concentric rings. The plurality of screens may be shifted within the plane in which they are arrayed so as to produce exposure in the areas which were previously between the screens.

In the illustrated exposure station in FIG. 3, the motorised arm (307) is a linear drive SLW-1040 made by Igus driven by a stepper motor that is able to raise and lower the exposure assembly station containing; the visual display screen (303) with optional additional backlighting, the optional screen protective film (305), the photopolymer containment vat (306) and photopolymer (304).

Figure 4:
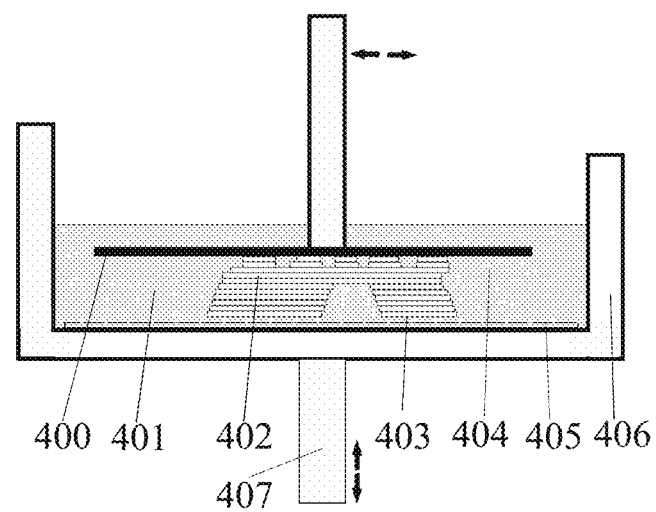
FIG. 4 illustrates a cross sectional view of an example washing station.

FIG. 4 describes a washing station layout to uniformly wash the parts of remaining liquid photopolymer using a washing solution and agitation method where the station only moves in the vertical axis. In the illustrated washing station in FIG. 4, the motorised arm (407) is able to raise and lower the washing units containing; a containment vat (406) containing washing solution (401) which can be water and a surfactant combined with an optional agitation device such as ultrasonic waves, pressure from spray nozzles or as in the example shown, bubbles (404) generated by an air-pressurised bar with small holes in it (405) formed from an air pump such as a low-flow positive displacement flexible impeller pump from Cole-Palmer. This process of cleaning is designed to remove surface photopolymer from the object (402).

Figure 5:
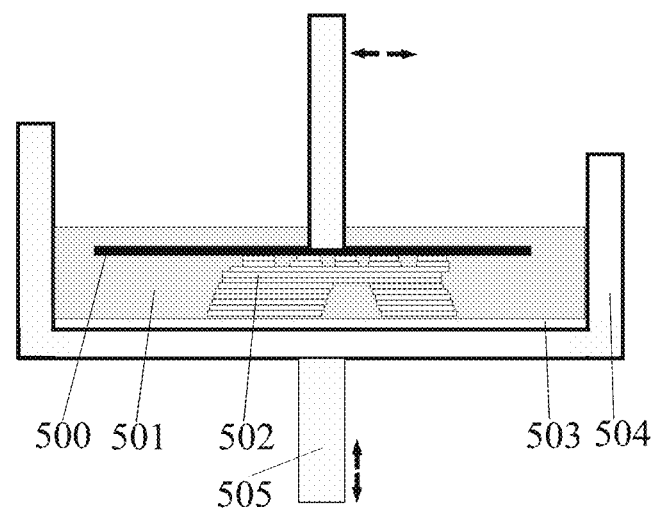
FIG. 5 illustrates a cross sectional view of an example post exposure station.

FIG. 5 describes a post exposure station layout to uniformly post expose the parts using a light emission array and an optional vessel containing water where the station only moves in the vertical axis. In the illustrated post exposure station in FIG. 5, the motorised arm (505) is able to raise and lower the post exposing units containing; a containment vat (504) containing optionally water (501) or a material that prevents oxygen from coming into contact with the surface of the object (502) which is attached to the build platform (500), the base (and optionally side walls) of the containment vat containing a light emission device (503) to illuminate the object with light of a suitable wavelength and intensity to initiate polymerisation and harden the object and leave it with a dry surface. The light array can be identical to that illuminating the screen in the exposure station.

Figure 6:
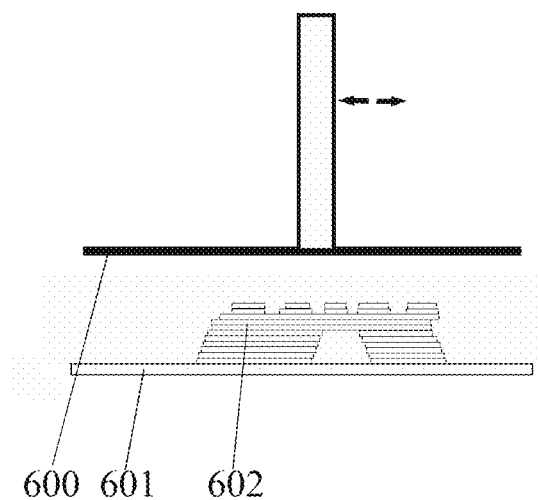
FIG. 6 illustrates a cross sectional view of an example loading and unloading station.

FIG. 6 describes an optional loading and unloading station where the printed object can be removed and replaced with a new platform. In the illustrated post exposure station in FIG. 6, the object (602) has been detached from the build platform (600) and transferred to a surface (601). The build platform is clean and is ready to rotate to the initial exposure station again. This removal may be automated by a variety of means including but not limited to a robotic arm or gantry, a system whereby the part is broken from its supports by flexing the build plate or a saw blade to cut the parts off.

The above described arrangement provides the advantage that the precision of the z-axis movement in the non-printing stations (wash station and post exposure station, load/unload station) does not need to be as precisely controlled as the precision of the z-axis movement for the exposure station. This reduces overall costs of the system and associated energy demands are reduced.

The figures provided herein are schematic and not to scale. Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The reader's attention is directed to all papers and documents which are filed concurrently with or previous to this specification in connection with this application and which are open to public inspection with this specification, and the contents of all such papers and documents are incorporated herein by reference.

The invention claimed is:

1. A stereolithographic 3D printer comprising:
a plurality of build platforms; and
a series of stations, each station having a function,
wherein the plurality of build platforms are configured to move from station to station and wherein the series of stations are configured to carry out their functions simultaneously, each operating at any given time on a different build platform of the plurality of build platforms or an object on said different build platform,
wherein each station moves in the z-direction independently of any other station, and
wherein the series of stations comprise:
an exposure station comprising a vat and a visual display screen, said vat and said virtual display screen being planar parallel and in direct contact, said exposure station being configured such that liquid photopolymer situated in the vat and between a build platform of the plurality of build platforms and the visual display screen is exposed to a series of images on the visual display screen, each image being a cross-section of the 3D object, partially curing the liquid photopolymer to form an intermediate object on the build platform of the plurality of build platforms;
a wash station configured to remove unpolymerised photopolymer from the intermediate object with a solution;
a post exposure station comprising an illumination source of a wavelength configured to polymerise the partially cured photopolymer of the intermediate object to form the 3D object; and optionally
a load and unload station to remove the 3D object from the build platform of the plurality of build platforms.

2. The stereolithographic 3D printer of claim 1, wherein the visual display screen is a liquid crystal display screen.

3. The stereolithographic 3D printer of claim 2 wherein the light emitted by the visual display screen is visible or near visible.

4. The stereolithographic 3D printer of claim 1 wherein the stations are each configured to move towards or away from the corresponding build platform of the plurality of build platforms operated on at a given time along a set of axes that are parallel to each other and wherein each build platform of the plurality of build platforms is configured to move in a direction perpendicular to said axes.

5. The stereolithographic 3D printer of claim 1 wherein the exposure process is independent of the wash process.

6. The stereolithographic 3D printer of claim 1 wherein each of the plurality of build platforms are discrete elements.

7. A method of printing a 3D object, said method comprising passing a plurality of build platforms through a series of stations each having a function,
wherein said stations are configured to carry out their functions simultaneously, each operating at any given time on a different build platform of the plurality of build platforms or the object on said different build platform,
wherein each station moves in the z-direction independently of any other station, and wherein the series of stations comprises the following stations:
  an exposure station comprising a vat of liquid photopolymer and a visual display screen, said vat and said virtual display screen being planar parallel and in direct contact;
  a wash station comprising a solution;
  a post exposure station comprising an illumination source of a wavelength; and optionally a load and unload station;
said method comprising:
  at the exposure station exposing liquid photopolymer situated in the vat and between a build platform of the plurality of build platforms and the visual display screen to a series of images on the visual display screen, each image being a cross-section of the 3D object, partially curing the liquid photopolymer to form an intermediate object on the build platform of the plurality of build platforms;
  at the wash station, removing unpolymerised photopolymer from the intermediate object with a solution;
  at the post exposure station polymerising the partially cured photopolymer of the intermediate object to form the 3D object; and optionally
  at the optional load and unload station, removing the 3D object from the build platform of the plurality of build platforms.

* * * * *